Patented Sept. 16, 1952

2,610,907

UNITED STATES PATENT OFFICE 2,610,907

PROCESS FOR RECOVERY OF OSMIUM AS OSMIUM TETRAOXIDE

Gustav A. Stein, Plainfield, Henry C. Vogel, West Orange, and Raymond G. Valerio, Plainfield, N. J., assignors to Merck & Co., Inc., Rahway, N. J., a corporation of New Jersey No Drawing. Application August 1, 1950, Serial No. 177,116

5 Claims. (Cl. 23—140)

This invention is concerned generally with processes for the recovery of the valuable and relatively scarce product, osmium tetroxide. More particularly, it relates to an improved method for the preparation of osmium tetroxide starting with crude mixtures containing lower oxides and salts of osmium.

Osmium tetroxide is an important reactant in the synthetic manufacture of cortisone which is utilized for the purpose of introducing a 17-hydroxyl group into the steroid molecule. This hydroxylation reaction is accomplished by reacting $\Delta^{17}$-3-hydroxy-11-keto-20-cyano-21-acyloxy-pregnene with osmium tetroxide in the presence of pyridine, thereby forming the 17,20-osmate ester of 3,17,20-trihydroxy-11-keto-20-cyano-21-acyloxy-pregnane, oxidizing the 3-hydroxyl radical in this compound by treatment with chromic acid as the oxidizing agent and subjecting the 17,20-osmate ester of 3,11-diketo-17,20-dihydroxy-20-cyano-21-acyloxy-pregnane thus obtained to the action of a hydrolyzing agent comprising sodium sulfite and potassium bicarbonate dissolved in methanol-benzene, thereby producing 3,11,20-triketo-17,21-dihydroxy-pregnane. The hydrolysis step, wherein the 17,20-osmate ester is hydrolyzed to produce the desired 17-hydroxyl-pregnane compound, results in the formation of a dark-brown, gummy precipitate which is separated from the hydrolysis mixture by filtration to produce the so-called "osmium cake" which consists of lower valence compounds of osmium contaminated with organic by-products. In view of the high cost and relative scarcity of osmium it has been of extreme importance in the synthesis of cortisone that the osmium be recovered from this "osmium cake" in the form of osmium tetroxide satisfactory for reuse in subsequent osmylation procedures.

It has been discovered that this recovery of the osmium in the form of osmium tetroxide can be accomplished by treating the "osmium cake" with an oxidizing agent thereby converting the lower valence compounds of osmium to osmium tetroxide, and subjecting the reaction mixture to steam distillation thereby steam distilling the osmium tetroxide directly from the reaction mixture. As noted hereinabove, the "osmium cake" contains lower valence compounds of osmium such as osmium dioxide and osmium sulfide admixed with other contaminating materials and organic by-products. The oxidation of this "osmium cake" to osmium tetroxide, utilizing conventional oxidation agents, has not been found to be practicable. We have discovered, however, that the oxidation is readily accomplished, and in substantially quantitative yields, by subjecting the "osmium cake" to the action of an aqueous solution containing chromic acid, nitric acid and sulfuric acid. When this mixture of acids is used as the oxidizing agent, the oxidation product containing the osmium tetroxide product can be subjected to steam distillation thereby distilling off an azeotropic mixture of water and osmium tetroxide vapors. The oxmium tetroxide can be readily separated from the distillate by cooling, thereby freezing the osmium tetroxide and decanting the water therefrom. Alternatively, the distillate can be extracted with benzene thereby forming a benzene solution of osmium tetroxide which is readily separated from the aqueous layer.

Although the present process is generally applicable to the recovery of osmium tetroxide from mixtures containing lower valence compounds of osmium, we ordinarily utilize this process for recovering osmium tetroxide from the "osmium cake" produced by the hydrolysis of the osmate ester intermediate in the synthesis of cortisone. This osmate ester intermediate, i. e. 17,20-osmate ester of 3,11-diketo-17,20-dihydroxy-20-cyano-21-acyloxy-pregnane, is overlayered with a mixture of benzene and methanol and a mixture of potassium bicarbonate and sodium sulfite is added thereto with agitation. The resulting mixture is stirred for a prolonged period of time, approximately 12 hours, and the hydrolysis mixture is allowed to separate and settle for about 3 to 4 hours. The heavy sludge of osmium compounds which precipitates, is separated from the liquid by filtration through a filter aid such as diatomaceous silica (Celite or Supercel). In order to accelerate filtration, sufficient chloroform is added to the material on the filter to cover the filter cake and to dissolve any product on the filter. The filter cake (i. e. "osmium cake") is washed with methanol, then with chloroform, and the chloroform-wet cake is ordinarily dried in a vacuum dryer at 160° F. for a period of 24 to 72 hours. Other methods of drying the cake may be utilized, or the "osmium cake" can be utilized wet without drying, if desired, in the subsequent oxidation reaction. It is ordinarily preferred, however, to dry the "osmium cake" since this cake is assayed to determine its content of osmium.

The osmium content of the cake is determined utilizing the colorimetric assay method described in Ind. Eng. Chem. (Anal. ed.) 16, 342 (1944). As noted hereinabove, the "osmium cake" thus prepared contains a mixture of lower valence compounds of osmium, i. e. the lower oxides such as osmium dioxide and osmium salts such as osmium sulfite. The average composition of the "osmium cake" is 8–14% osmium salts (calculated as osmium tetroxide), 10–20% filter aid, the balance consisting of inorganic salts such as sodium sulfite and potassium bicarbonate, and organic matter including solvents.

As previously mentioned, the present process, although generally applicable for recovering osmium tetroxide from mixtures containing lower valence compounds of osmium, is ordinarily utilized for recovering osmium tetroxide from the "osmium cake" prepared as described hereinabove. In carrying out the present process, the mixture of lower valence compounds of osmium (i. e. the lower oxides and salts of osmium) is mixed with an aqueous solution containing chromium trioxide, sulfuric acid and nitric acid, and the resulting mixture heated under reflux thereby oxidizing the osmium compounds to osmium tetroxide. Two factors have been found to be critical in this oxidation procedure, namely: (1) there must be a large excess of reagents, i. e. chromic acid, nitric acid, and sulfuric acid. (2) there must be adequate agitation in order to quantitatively convert the osmium dioxide and/or osmium sulfite in the cake to osmium tetroxide within a reasonable period of time. It has been found advantageous to employ a reagent concentration of 1.1 gms. of chromium trioxide, 1.6 ml. of concentrated sulfuric acid and 0.3 ml. of concentrated nitric acid per gram of dry "osmium cake." It is possible to employ a somewhat lower concentration of reagents, but when this is done, the reaction time is greater. When the preferred concentration of reagents is utilized, the conversion of the lower valence compounds of osmium to osmium tetroxide is usually completed in about 10 hours, whereas at lower concentrations, the time is ordinarily 20–22 hours. The agitation must be sufficient to provide intimate contact of the "osmium cake" with the reagents. Ordinarily, the aqueous solution of chromium trioxide is first added to the cake followed by the calculated addition of nitric acid and sulfuric acid, which are also added gradually. After the addition of the acids, which is carried out under agitation, the reaction mixture is stirred and heated under reflux for a period of 10 to 20 hours depending upon the concentration of the reagents and at a temperature of 116–130° C. At the end of this time, the oxidation of the lower valence compounds of osmium to osmium tetroxide is substantially complete.

The reaction mixture is then subjected to steam distillation under which conditions we have found that a constant boiling, azeotropic mixture of water and osmium tetroxide distills at 92° C. The mixture consists of approximately 85% osmium tetroxide and 15% water by weight. In order to fractionate this azeotrope from other volatile components present in the reaction mixture, it has been found best to conduct the distillation utilizing a distilling column and a reflux ratio of 5:1 to 10:1.

The distillate is ordinarily condensed by passing it through a condenser and then through a receiver cooled to −60° C. with methanol, wherein the bulk of the osmium tetroxide is recovered in solid form from the condenser and receiver. It is ordinarily preferred to recover the osmium tetroxide in the form of a benzene solution by passing the distillate through a series of benzene scrubbers or by blowing benzene (with the aid of an inert gas such as nitrogen) through the receiver. Benzene is an excellent solvent of osmium tetroxide and the resulting benzene solution (containing 20–30% osmium tetroxide) may be used as such, without isolating the osmium tetroxide, in the osmylation reaction hereinabove described. Instead of benzene, other organic solvents such as carbon tetrachloride, chloroform, cyclohexane may be used to extract the osmium tetroxide.

Any osmium tetroxide vapors which are not condensed in the methanol-cooled receiver are preferably adsorbed in a methanol-cooled aftercondenser and a series of caustic scrubbers, where osmium tetroxide reacts with sodium hydroxide to form sodium osmate and sodium perosmate, which may be recycled to the reaction still along with "osmium cake" for further recovery of osmium tetroxide. By this procedure, it has been possible to recover as much as 98% of the osmium (as osmium tetroxide) in the laboratory, and up to 90–99% in the large-scale factory process. In view of the high price of osmium tetroxide, this almost quantitative recovery of this expensive reagent used in the osmylation step of the cortisone process constitutes an important saving in the cost of manufacture of the hormone.

The following examples illustrate methods of carrying out the present invention, but it is to be understood that these examples are given for purposes of illustration and not of limitation.

*Example 1*

A 300 gram sample of dry "osmium cake" containing osmium dioxide, and osmium sulfite equivalent to about 27.2 g. osmium, obtained from the hydrolysis of the 17,20-osmate ester of 3,11-diketo - 20 - cyano - 21 - acetoxy-17,20-dihydroxypregnane, was placed in a three-liter Morton reaction flask which was fitted with an addition funnel, a stirrer and a packed column. The packed column was connected at its upper end to a reflux condenser which, in turn, was connected by means of an air condenser to a 250 ml., three-necked, round bottom flask which served as a receiver for the distillate from the reaction flask. The receiver was immersed in a dry-ice, chloroform mixture, and one of the outlet necks of the receiver was attached to an air trap which, in turn, was connected to three caustic traps in series.

A solution of 168 g. chromium trioxide in 350 ml. water was slowly added to the filter cake with the agitator running and with cooling water circulating through the reflux condenser. When all of the chromium trioxide had been added, 50 ml. of concentrated nitric acid was then added followed by a solution of 182 ml. of concentrated sulfuric acid dissolved in 500 ml. of water. The resulting mixture was heated under reflux for approximately 22 hours thereby oxidizing the lower valence compounds of osmium tetroxide.

The reaction mixture was then distilled. At the start of the distillation, the reflux condenser surmounting the packed column was drained of its water, and the only reflux was thus due to the cooling effect of the air in contact with the condenser and the column. As the distillation progressed, and the amount of liquid osmium tetroxide in the distillate began to decrease, the water reflux was resumed. When no more osmium tetroxide appeared in the distillate, the system was returned to total reflux.

The solid osmium tetroxide in the 250 ml., three-necked receiving flask was allowed to thaw out at room temperature, was separated from the water, and was dried to produce 25.05 g. of substantially pure osmium tetroxide. This corresponded to a yield of 92.2% of theory based on the osmium dioxide and the osmium sulfite contained in the filter cake utilized as the starting material.

An additional 7.6% of osmium compounds, recovered in the water decanted from the osmium tetroxide distillate, and in the caustic scrubbers was recycled to a subsequent oxidation reaction. Thus, the overall recovery of osmium tetroxide from the "osmium cake" was over 99% of that theoretically obtainable.

In a second experiment, starting with 300 g. of "osmium cake," which was described above, there was obtained 28.68 gms. of pure osmium tetroxide; yield approximately 98.1% of theory. The osmium compounds in the aqueous layer of the distillate and the caustic scrubber amounted to less than 0.4% of theory.

Example 2

The wet filter cake containing osmium dioxide and osmium sulfite, obtained from a pilot plant hydrolysis of the 17,20-osmate ester of 3,11-diketo-17,20-dihydroxy-20-cyano-21-acetoxy pregnane, was dried in a vacuum oven at a temperature of approximately 50° C. and a vacuum of 28" of mercury. Under these conditions, the volatile organic material was removed, after 24 hours of drying, to produce 16.5 kg. of dry "osmium cake."

Ten individually portions of this cake were processed according to the procedure described in Example 1 utilizing substantially the same relative proportions of reactants given in that example except as indicated hereinbelow. Four experiments (A, B, F and G) were carried out utilizing a procedure substantially identical with that described in Example 1. A further experiment (C) was carried out in the same manner as in experiments A and B, except that the amount of chromium trioxide employed was 50% greater. Two additional experiments (D and E) were similar to experiments A and B except that, after the first product was distilled, additional amounts of chromic acid, nitric acid and sulfuric acid were added to the reaction mixture, and a second product was distilled following a second oxidation reaction. Two experiments (H and I), otherwise identical with experiments A and B, were carried out utilizing double quantities of reagents utilized in those experiments. An additional experiment (J), which was carried out utilizing the same quantities of reagents and the same reaction conditions as were used in experiments H and I shows the yield obtained after an oxidation time of 1½ hours and 6 hours respectively.

The quantities of reactants, the operating conditions and the yield of osmium tetroxide produced are summarized in the following table:

| Expt. No. | "Osmium Cake" Weight in Grams | Weight of CrO3 Grams | Vol. of Conc. H2SO4 Ml. | Vol. of Conc. HNO3 Ml. | Vol. of Water Ml. | Period of Reflux Hours | Yield of OsO4 Including Recoveries Percent of Theory |
|---|---|---|---|---|---|---|---|
| A | 1,200 | 679 | 728 | 210 | 2,000 | 48 | 86.5 |
| B | 1,200 | 671 | 728 | 210 | 3,000 | 44 | 86.5 |
| C | 1,200 | 1,000 | 728 | 210 | 2,000 | 22 | 91.3 |
| D | 1,200 | 1,312 | 1,456 | 410 | 2,900 | 69 | 94.9 |
| E | 1,200 | 1,641 | 1,456 | 400 | 2,400 | 45.5 | 99.1 |
| F | 300 | 168 | 183 | 50 | 850 | 23 | 87.2 |
| G | 300 | 168 | 183 | 50 | 850 | 22 | 87.9 |
| H | 300 | 336 | 370 | 100 | 860 | 21.5 | 100.0 |
| I | 300 | 336 | 370 | 100 | 860 | 23 | 100.0 |
| J | 300 | 336 | 370 | 100 | 860 | 1.5 / 25.5 | 97.0 / 99.6 |

Example 3

The chloroform-wet filter cake containing osmium dioxide and osmium sulfite, obtained by hydrolysis of the 17,20-osmate ester of 3,11-diketo-17,20-dihydroxy-20-cyano-21-acetoxy pregnane was dried at a temperature of 160° F. in a vacuum dryer for a period of 72 hours. The dry "osmium cake" thus obtained was then hand-ground utilizing metal-sheathed grinders, charged to a stainless steel lock-top drum, mixed, and sampled. The sample was assayed colorimetrically and the cake was found to contain approximately 10% equivalent osmium tetroxide and approximately 15% filter aid by weight, the balance being inorganic salts and organic matter.

40 kg. of this dry, assayed "osmium cake" was charged to a reaction still, which was connected to a fractionating column equipped with Berl saddles, the top of the column being connected, in turn, with a reflux condenser. The contents of the still were placed under a partial vacuum of 5" to 8" of water and this was maintained during the operation of the unit in order to prevent the escape of osmium tetroxide vapors into the atmosphere. The reactants were then charged to the still in the following order: (1) 20 gallons of water; (2) 44 kg. of chromium trioxide in aqueous solution; (3) 12 liters of concentrated nitric acid and (4) 64 liters of concentrated sulfuric acid. During the addition of these reagents, cooling water was circulated in the still jacket and the mixture was subjected to agitation. The rate of addition was adjusted so that gas evolution was not too rapid and the addition required approximately 1½ hours.

After all of the sulfuric acid had been added, the cooling water was shut off and steam was applied to the jacket while maintaining the contents of the still under a slight negative pressure. Cooling water was then turned on in the reflux condenser connected to the top of the fractionating column attached to the still, and the mixture in the still was heated to the boiling point. Heating was continued, while maintaining the mixture under reflux at a temperature of approximately 120° C. for a period of approximately 13 hours. The constant-boiler (osmium tetroxide-water) refluxed at a temperature of 92° C. under normal barometric pressure.

After the oxidation reaction was complete, a portion of the vapors leaving the top of the packed column were condensed and removed as distillate, the remainder being returned to the column. During this distillation operation, a reflux ratio of between 5 to 1 and 10 to 1 was maintained. The distillate, thus obtained, which showed a constant boiling point of approximately 92° C. contained approximately 85% tetroxide and 15% water by weight. Any vapors which were not condensed at this point were passed through caustic scrubbers which removed residual osmium tetroxide from the gas stream.

After the oxidation reaction and distillation were complete, the condenser and receiver were thawed by passing warm liquid through their jackets, and the residual osmium tetroxide was washed therefrom by means of benzene. The benzene-osmium tetroxide layer was then separated from the water component of the distillate and the residual water layer was again extracted with benzene. The osmium tetroxide-benzene solution thus obtained was found to be satisfactory for subsequent osmylation of $\Delta^{17}$-3-hydroxy-11-keto-20-cyano-21-acetoxy-pregnene.

Modifications may be made in carrying out the present invention without departing from the spirit and scope thereof. Insofar as these changes and modifications are within the purview of the annexed claims, they are to be considered as part of our invention.

We claim:

1. The process of preparing osmium tetroxide from an osmium residue containing a lower valence compound of osmium admixed with organic matter which comprises reacting together said osmium residue, chromic acid, nitric acid and sulfuric acid, said reaction being carried out by heating the reactants in aqueous solution under reflux, thereby producing a reaction mixture containing osmium tetroxide, subjecting the reaction mixture to distillation thereby distilling an azeotropic mixture of water and osmium tetroxide, and separating osmium tetroxide from the resulting distillate.

2. The process of preparing osmium tetroxide from an osmium residue containing lower oxides and salts of osmium admixed with organic matter which comprises reacting together said osmium residue, chromic acid, nitric acid and sulfuric acid, said reaction being carried out by heating the reactants in aqueous solution under reflux, thereby producing a reaction mixture containing osmium tetroxide, subjecting the reaction mixture to distillation thereby distilling an azeotropic mixture of water and osmium tetroxide, and cooling, thereby separating osmium tetroxide from the resulting distillate in solid form.

3. The process of preparing osmium tetroxide from an osmium residue containing a lower valence compound of osmium admixed with organic matter which comprises reacting together said osmium residue, chromic acid, nitric acid and sulfuric acid, said reaction being carried out by heating the reactants in aqueous solution under reflux, thereby producing a reaction mixture containing osmium tetroxide, subjecting the reaction mixture to distillation thereby distilling an azeotropic mixture of water and osmium tetroxide, and extracting the osmium tetroxide from the resulting distillate utilizing benzene as the extracting solvent.

4. The process which comprises reacting together, in aqueous solution under reflux, an osmium residue containing a lower valence compound of osmium admixed with organic matter, chromic acid, nitric acid and sulfuric acid, thereby converting said lower valence compound of osmium to osmium tetroxide.

5. The process which comprises reacting together, in aqueous solution under reflux, an osmium residue containing lower oxides and salts of osmium admixed with organic matter, chromic acid, nitric acid and sulfuric acid, thereby converting said lower oxides and salts of osmium to osmium tetroxide.

GUSTAV A. STEIN.
HENRY C. VOGEL.
RAYMOND G. VALERIO.

REFERENCES CITED

The following references are of record in the file of this patent:

UNITED STATES PATENTS

| Number | Name | Date |
| --- | --- | --- |
| 1,081,566 | Becket | Dec. 16, 1913 |
| 1,904,582 | Watts | Apr. 18, 1933 |
| 2,049,488 | Braun | Aug. 4, 1936 |
| 2,386,081 | Archibald et al. | Oct. 2, 1945 |

OTHER REFERENCES

Mellor, Comprehensive Treatise on Inorganic and Theoretical Chemistry, vol. 15 (1936) Longmans, Green & Co., London, pages 687, 688, 707, 709.